United States Patent [19]

Rieder et al.

[11] Patent Number: 4,631,830
[45] Date of Patent: Dec. 30, 1986

[54] INSTRUMENT FOR MEASURING LENGTHS

[75] Inventors: Heinz Rieder, St. Pantaleon; Max Schwaiger, Ostermiething, both of Austria

[73] Assignee: RSF Elektronik Gesellschaft m.b.H., Tarsdorf, Austria

[21] Appl. No.: 750,530

[22] Filed: Jun. 28, 1985

[30] Foreign Application Priority Data

Jul. 3, 1984 [AT] Austria .................................. 2138/84

[51] Int. Cl.⁴ ............................................ G01B 11/02
[52] U.S. Cl. .................. 33/125 R; 33/125 A
[58] Field of Search ............. 33/125 R, 125 A, 125 C, 33/125 T

[56] References Cited

U.S. PATENT DOCUMENTS

| | | | |
|---|---|---|---|
| 4,170,829 | 10/1979 | Nelle | 33/125 C |
| 4,262,423 | 4/1981 | Affa | 33/125 A |
| 4,400,880 | 8/1983 | Nelle | 33/125 C |
| 4,430,799 | 2/1984 | Affa | 33/125 C |
| 4,475,289 | 10/1984 | Nelle | 33/125 C |
| 4,492,032 | 1/1985 | Nelle | 33/125 C |
| 4,512,082 | 4/1985 | Burkhardt | 33/125 R |

FOREIGN PATENT DOCUMENTS 3136981  1/1983  Fed. Rep. of Germany .

Primary Examiner—Willis Little
Attorney, Agent, or Firm—Karl F. Ross; Herbert Dubno

[57] ABSTRACT

A sealed instrument for measuring lengths comprises a carrier, a scale mounted on said carrier, and an optoelectronic scanning unit including a scanning plate, light emitters and light receivers. The scanning unit is adjustable along the scale by means of a feeler, which includes an actuating member. A correcting device is provided, which includes a deformable correcting template and a template follower for scanning the correcting template and for adjusting the scanning plate relative to the actuating member in the direction of the scanning movement. In order to reduce the overall expenditure, to simplify the correction and to increase the reliability of operation and the accuracy of the measurement, only the scanning plate is operatively connected by an adjusting mechanism to the template follower and is adjustable relative to the remaining parts of the scanning unit in dependence on the configuration of the correcting template.

7 Claims, 7 Drawing Figures

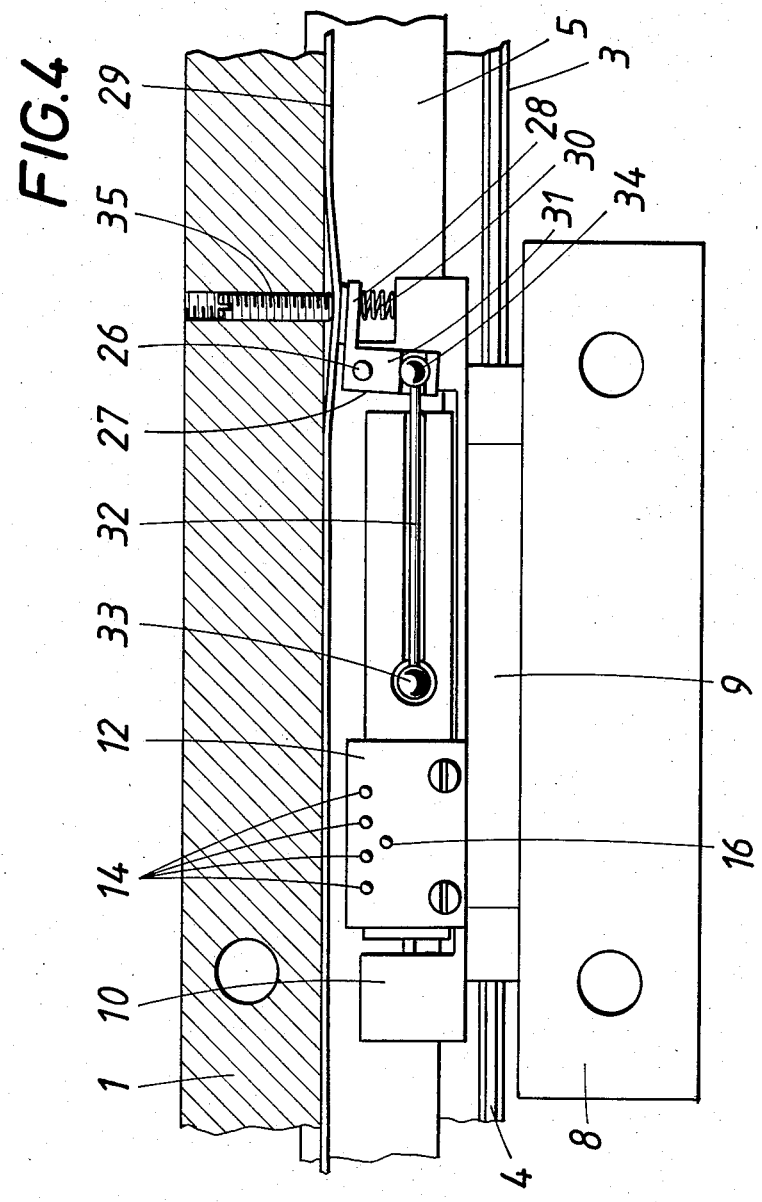

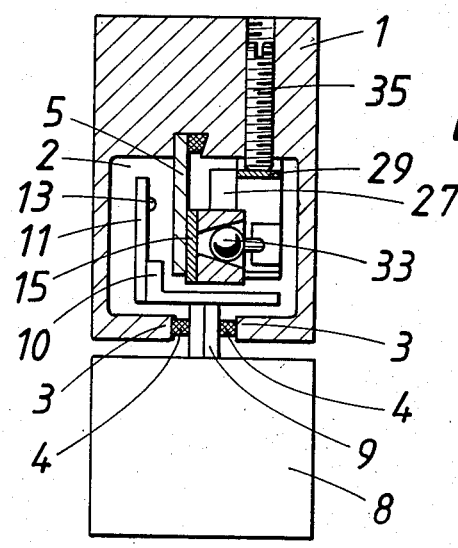

INSTRUMENT FOR MEASURING LENGTHS

BACKGROUND OF THE INVENTION

1. Field of the Invention

This invention relates to an instrument for measuring lengths, particularly to a sealed instrument for measuring lengths, comprising a carrier, a rule mounted on said carrier and provided with a scale, and an optoelectronic scanning unit, which is movable along said scale and comprises a scanning plate, light emitters and light receivers, also comprising an actuating member constituting a feeler and is operable to move said scanning unit along said scale, and a correcting device including a deformable correcting template and a template follower for scanning said template and for adjusting scanning plate relative to the actuating member in the direction of the scanning movement.

2. Description of the Prior Art

In instruments of this kind for measuring lengths, possible errors are to be corrected to a large extent. Such measuring errors may be due to pitch errors of the scale, deviations of the direction of the scale from the actual direction of the measurement, deviations of the direction of the track for the scanning unit from the direction of the scale, or machine defects, if the instrument is to be used with a machine tool. It is known that instruments for measuring lengths can be mounted in a measuring machine or can be permanently mounted on a machine tool to be provided with such instruments and that the path along which the measurement is to be effected can be scanned with the instrument for measuring lengths and with a higher-ranking measuring system, which has a higher accuracy and a higher resolution than said instrument and may consist, e.g., of a laser interferometer. Differences between the measurements taken by the instrument for measuring lengths and the higher-ranking system can thus be detected. Such differences can then be compensated with the aid of the correcting device. For this purpose, the shape of the correcting template is changed so that a template can be used to adjust the scanning plate relative to the actuating member along the scale and the desired compensation can thus be effected.

In known instruments for measuring lengths the entire scanning unit including the scanning plate, light emitters and light receivers is relatively mounted on a component which is connected to the feeler and which is guided in the carrier for the rule; that carrier usually consists of a profiled tube. The scanning unit is mounted on said component for a movement along the scale and the correcting device preferably consists of a link chain which includes individual links connected by pin-slot joints and which is provided at the end of each link with eccentric cams for deflecting the chain from a straight initial configuration that is parallel to the tubular carrier. As a result of such deflections, the chain constitutes a correcting template, which has straight sections that are substantially equal in length. In the simplest case the template follower is mounted on a lever, which is pivotally movable transversely to the scale, the template follower is connected to an eccentric cam, and springs are provided which urge the scanning unit against that cam. In such an arrangement a pivotal movement of the level will result in a longitudinal displacement of the scanning unit relative to the scale. In another arrangement, the link chain is replaced by an angle section member, one flange of which has regularly spaced apart indentations so that the other flange can be more easily bent adjacent to said indentations. In such an instrument the angle section member is bent at the identations with the aid of adjusting members to constitute a correcting template.

A disadvantage of the known designs resides in that the scanning unit, which is movably supported and adjustable in its entirety, has a relatively heavy weight so that a backlashfree adjustment can be effected by means of the template follower only if strong forces are exerted to urge the scanning unit against the template follower and to urge the template follower against the correcting template. Otherwise any vibrations or shocks of the instrument, which will be inevitable if the instrument is mounted on a machine tool, may effect a longitudinal displacement of the scanning unit. The leads connected to the light emitters and the light receivers must be flexible between the scanning unit and the support in order to permit a relative adjustment. Because the forces which are exerted are relatively strong, the deformable correcting template and the adjusting mechanism must be relatively strong.

SUMMARY OF THE INVENTION

It is an object of the invention to provide for the measurement oflengths an instrument which is of the kind described first hereinbefore and which is simpler in structure than the known instruments for measuring lengths but has a higher reliability in operation and a longer life and in which a correction can be effected in a simpler manner and with higher accuracy than in the known instruments for measuring lengths.

In an instrument for measuring lengths which is of the kind described first hereinbefore, that object is accomplished in that only the scanning plate is operatively connected by an adjusting mechanism to the template follower adjustable relative to the remaining parts of the scanning unit in dependence on the shape of the correcting template.

A basic recognition underlying the invention resides in that an exact correction and the measurement of a given fractional part of an increment of the scale depends on the position or adjustment of the scanning plate relative to the scale and that a small change of the position of the scanning plate relative to the light emitters and the light receivers will not effect a change of the result of the measurement so that signals which can be properly processed will be obtained even when the position of the scanning plate relative to the light emitters and light receivers has been slightly changed. If an incremental scale is scanned in practice with a scanning plate having a plurality of gratings, which are offset from each other in the scanning direction by a fractional part of the scale division and any desired number of such scale divisions, and a separate light receiver is associated with each of said gratings and a common light emitter or a separate light emitter for each grating is associated with said scanning plate, the changes of the signal amplitude or of the d.c. component of the signals which are delivered by the light receivers will be subjected only to small changes during the measuring operation in case of such small changes of the relative position. Said signals delivered by the light receivers are in most cases approximately sinusoidal and displaced in phase relative to each other. The light receivers and the light emitter or emitters as well as the leads connected to them may be fixedly installed. The scanning plate alone is relatively light in weight so that it will be subjected only to relatively small forces in case of vibrations and shocks occurring in the machine. As a result, relatively small forces will be sufficient to maintain the template follower in engagement with the correcting template.

In accordance with a further feature of the invention, measuring errors caused by mass forces which act on the scanning plate as a result of vibrations and shocks are avoided to a large extent because the adjusting mechanism consists of a screw mechanism including a screw, which extends along the scale, and a nut, which is arranged to rotate about the screw as the correcting template is scanned by the template follower. In such an arrangement, which includes also a worm-and-rack mechanism, the scanning plate can be directly coupled to the adjusting mechanism without a provision of interposed springs.

In another embodiment, in which the adjusting mechanism and the scanning plate can also be directly interconnected, the scanning mechanism consists of a lever, particularly a bell crank lever, which is pivoted to the scanning unit and has one arm that is urged by a spring against the correcting template whereas the lever is connected to the scanning plate by a connecting rod, which preferably acts on the other arm.

Because small forces are sufficient to maintain the template follower in contact with the correcting template, that correcting template may be constituted by a lightweight member. For this reason the invention includes also an embodiment in which the scale and the scanning unit are accommodated in profiled tubular carrier and the correcting template consists of a tensioned metal strip, the configuration of which is adjustable by spaced apart adjusting screws, which are screwed in the carrier.

That concept may be adopted in various ways. In the simplest arrangement, the strip which is gripped at its ends can be deflected relative to said gripped ends only toward one side so that only simple pressure-applying screws are required for that purpose. But such an arrangement involves restrictions regarding the nature of the possible corrections. For a comprehensive correction the strip should be deflectable in both directions from neutral position so that the strip may have concave and convex surfaces facing the template follower. This can be accomplished in that at least part of the adjusting screws are connected to the strip so that they can move the strip by compressive and tensile forces.

In a simple arrangement, a steel strip is provided, which is held only at its length ends and which is tensioned by a spring and can be scanned by the template follower throughout the length of the strip. A simple overall structure will be obtained and the strip can be used to provide correcting templates in different configurations if the correcting template as well as the scale and the scanning unit are accommodated in a profiled tubular carrier and the correcting template consists of a metal strip having one edge which is held in a groove of the tubular carrier between elastically yieldable inserts engaging the broadside of the strip near that one edge, whereas the configuration of the strip along its length can be changed by adjusting screws, which engage the strip near its other edge. In that arrangement the template follower engages the strip on its broadside outside the groove. In such an arrangement the strip can be bent not only in its longitudinal direction but also in a lateral direction so that the desired configuration of the template can be obtained in the range in which the template is engageable by the template follower.

In a different embodiment the deformable correcting template is constituted by a laminate consisting of a metal strip and a transversely folded plastic strip, which is mounted on said metal strip on one side thereof and is connected to the metal strip at those fold lines which face the metal strip, said plastic strip is provided opposite to the metal strip with nuts or with another metal strip formed with holes, and adjusting screws are screwed into said nuts or holes. Such a laminate is light in weight but constitutes a sufficiently stiff component which can be deformed to constitute various curved correcting template sections, and the adjusting screws are anchored in said component in a simple and satisfactory manner.

Particularly if substantial changes in the height of the correcting template will not be required, the correcting template may consist of a single thin bar, which is integrally formed with the profiled tubular carrier that accommodates the scale and the scanning unit, and said bar is adapted to be bent to constitute a shaped correcting template.

BRIEF DESCRIPTION OF THE DRAWINGS

FIG. 4 is a longitudinal sectional view showing a different instrument for measuring lengths, the section being taken through the carrier.

FIG. 5 is a transverse sectional view showing the instrument of FIG. 4.

FIG. 6 is a fragmentary transverse sectional view showing the carrier provided with a modified deformable correcting template and FIG. 7 is a corresponding view showing another modified deformable correcting template.

DETAILED DESCRIPTION OF THE DRAWING

Further details and advantages of the invention will be apparent from the following description of the embodiment shown on the drawings.

Figure 1:
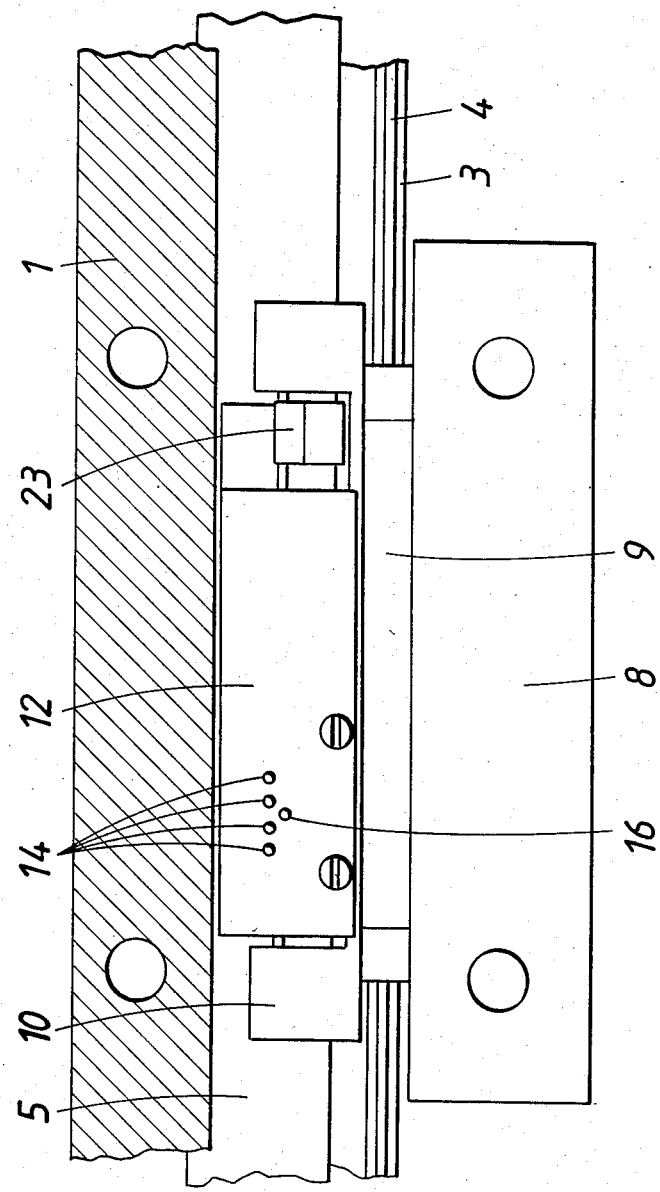
FIG. 1 is a longitudinal sectional view showing an instrument in accordance with the invention for measuring lengths, the section being taken through the carrier of the instrument.
Figure 2:
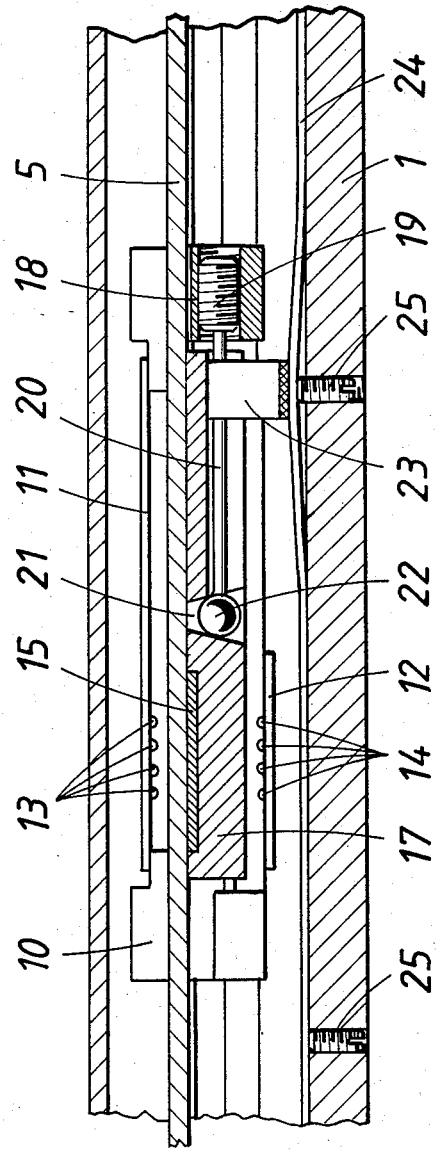
FIG. 2 is a horizontal sectional view showing the instrument of FIG. 1.
Figure 3:
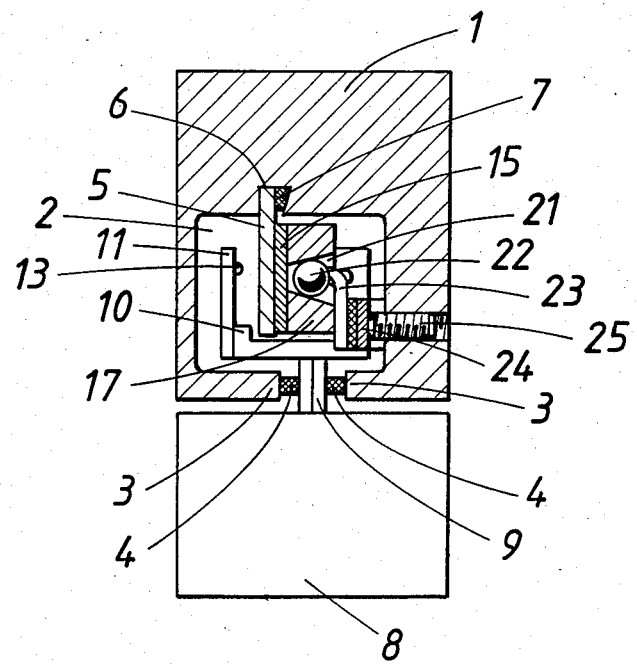
FIG. 3 is a corresponding transverse sectional view.

In the embodiment shown in FIGS. 1 to 3, a tubular carrier 1 consists of a drawn extruded section. The cavity 2 in the tube 1 is accessible through a slot, which is defined between flanges 3 at the bottom of the tube and is sealed by sealing lips 4. A glass rule 5, which carries an incremental scale, is mounted in the cavity 2 of the tube 1. In the present embodiment one edge portion of the rule 5 extends into a dovetail groove 6 formed in the inside surface of the tube 1 and is fixed in said groove by a resilient cord 7.

A feeler is associated with the object to be measured and comprises an actuating or coupling member 8, which is rigidly connected to a scanning unit by means of a sword 9, which extends through the slot between the sealing lips 4. In accordance with FIGS. 1 to 3, the scanning unit comprises a carriage 10 and printed circuit of boards 11, 12, which are secured to the carriage 10 and extend on both sides of the rule 5. Light-emitting diodes 13 are carried by the printed circuit board 11. Phototransistors 14 are carried by the printed circuit board 12. The printed circuit boards 11, 12 are also provided with amplifier and processing circuits. As has been mentioned, the printed circuit boards 11, 12 are fixedly connected to the carriage 10. A scanning plate 15 is disposed between the printed circuit boards 11, 12 and is guided by the rule and comprises, e.g., four gratings, which are associated with respective ones of the phototransistors 14 and have the same pitch as the incremental scale on the rule 5 and are offset from each other along the scale by entire scale increments and fractional parts of a scale increment. The movement of the carriage 10 along the rule 5 when the light emitters 13 and phototransistors 14 are energized will have the result that signals which are displaced in phase from each other will be generated by the phototransistors 14. An additional grating as well as a light emitter and a phototransistor 16 associated with that additional grating may be mounted on the carriage 10 and may be used to detect reference marks provided on the rule 5.

The scanning plate 15 is mounted in a bracket 17, which leaves the plate 15 uncovered between the light emitters 13 and the phototransistors 14. The scanning plate 15 and the bracket 17 are movable in unison along the rule 5 relative to the carriage 10. A longitudinal adjustment is imparted to the scanning plate 15 and the bracket 17 by a mechanism which includes female screw threads 18, which are carried by the carriage 10 and in threaded engagement with a screw 19. The latter is connected by a connecting rod 20 to a ball 22, which is disposed in a recess 21 of the bracket 17. A lever 23 is secured to the connecting rod 20 and by a spring, not shown, is urged against a deformable correcting template 24 and in dependence on the configuration of that correcting template 24 rotates the connecting rod 20 to that the latter is longitudinally adjusted relative to the carriage 10 by the mechanism comprising the screw 19 and the female screw threads 18.

In the embodiment shown in FIGS. 1 to 3, the deformable correcting template consists of a tensioned metal strip, which extends in the cavity 2 of the tube 1 along one side wall thereof and the configuration of which can be adjusted by means of headless screws 25 which are screwed in the wall of the tube and are accessible from the outside of said tube for a rotation of said screws.

The embodiment shown in FIGS. 4 and 5 differs from the embodiment shown in FIGS. 1 and 3 only as regards the mechanism for adjusting the scanning plate 15. For this reason all other parts are designated with the same reference characters as in FIGS. 1 to 3.

In the embodiment shown in FIGS. 4 and 5, the scanning plate 15 is adjusted by means of a bell crank lever 27, which is pivoted to the carriage 10 on a transverse pivot 26. One arm 28 of the lever 27 constitutes a template follower, which is urged against a deformable correcting template 29 by a compression spring 30. The second arm 31 of the bell crank lever 27 is operatively connected to the carriage 10 by a connecting rod 32, which is provided at its ends with balls 33, 34. The correcting template consists of a tensioned steel strip, which has a longitudinal configuration that can be adjusted by means of headless screws 35. Springs may be provided for tensioning the steel strip 29 in its longitudinal direction.

In the embodiment shown in FIG. 6 the tube 1 is formed on the inside of one side wall 1a with a dovetail groove 36, which receives one longitudinal edge portion of a steel strip 37. That steel strip 37 is gripped between cords or circular-section elements 38, which consist of rubber or of a material having a rubberlike elasticity and have been forced into the groove 36. With a major part of its width the steel strip 37 extends into the cavity 2 of the tube 1. Instead of steel, the strip 37 may consist of a different metal. For an adjustment of the steel strip 37 to a desired configuration, a plurality of screws 39 spaced apart along the strip 37 are mounted in the wall of the tube 1 and are accessible from the outside of the tube 1. On the edge that is opposite to the groove 36, the steel strip 37 is straddled by shoes 42, which are in registry with respective screws 39. Each screw 39 is coupled to the adjacent shoe 42 by means of two collars 40 mounted on the screw 39 and an eyelet which is gripped between the collars 40 and rigid with the shoe 42. The screws 39 are operable from the outside of the tube 1 to adjust the adjacent edge portion of the strip 37 transversely to the groove 36 in one direction or the other and the resulting correcting template can be scanned by the template follower 28.

In a different embodiment, the strip 37 might be replaced by an integral thin rib, which is integrally formed with the tube 1.

In the embodiment shown in FIG. 7 the shaped correcting template is constituted by a metal strip 43, which together with a transversely folded plastic strip 44 constititues a laminate. Nuts 45 or a second continuous metal strip are or is secured to the plastic strip 44 at those fold lines which are remote from the metal strip 43. The nuts 45 or holes in the second metal strip 45 are engaged by headless screws 46, which are accessible and operable from the outside of the tube 1 so that the head nuts or the strip 45 can be moved transversely to the strip 43 by a rotation of the screws 46.

In the embodiments shown by example, the light emitters and light receivers of the optoelectronic scanning unit are disposed on opposite sides of the scanning unit 15 and the rule 5 so that the light receivers receive light that has been transmitted by the scanning plate 15 and the rule 5. Alternatively, the light emitters and light receivers may be disposed on the same side of the rule so that the light receivers receive light that has been reflected by the scale plate or by a reflective coating provided on the side of the rule that is opposite to the scanning unit.

We claim:

1. An instrument for measuring lengths, particularly to a sealed instrument for measuring lengths, comprising a carrier, a rule mounted on said carrier and provided with a scale, and an optoelectronic scanning unit, which is movable along said scale and comprises a scanning plate, light emitters and light receivers, also comprising an actuating member, which constitutes a feeler and is operable to move said scanning unit along said scale, and a correcting device including a deformable correcting template and a template follower for scanning said template and for adjusting the scanning plate relative to the actuating member in the direction of the scanning movement, characterized in that only the scanning plate is guided by said rule and is operatively connected by an adjusting mechanism to the template follower adjustable relative to the remaining parts of the scanning unit in dependence on the shape of the correcting template, said adjusting mechanism comprising a screw which extends along the scale and a nut which is arranged to rotate about the screw as the correcting template is scanned by the template follower.

2. An instrument according to claim 1, characterized in that the scanning mechanism consists of a lever, particularly a bell crank lever, which is pivoted to the scanning unit and has one arm that is urged by a spring against the correcting template whereas the lever is connected to the scanning plate by a connecting rod, which preferably acts on the other arm.

3. An instrument according to claim 1, characterized in that the scale and the scanning unit are accommodated in profiled tubular carrier and the correcting template consists of a tensioned metal strip, the configuration of which is adjustable by spaced apart adjusting screws, which are screwed in the carrier.

4. An instrument according to claim 3, characterized at least part of the adjusting screws are connected to the strip so that they can move the strip by compressive and tensile forces.

5. An instrument according to claim 1, characterized in that the correcting template as well as the scale and the scanning unit are accommodated in a profiled tubular carrier and the correcting template consists of a metal strip having one edge which is held in a groove of the tubular carrier between elastically yieldable inserts engaging the broadside of the strip near that one edge, whereas the configuration of the strip along its length can be changed by adjusting screws, which engage the strip near its other edge.

6. An instrument according to claim 1, characterized in that the deformable correcting template is constituted by a laminate consisting of a metal strip and a transversely folded plastic strip, which is mounted on said metal strip on one side thereof and is connected to the metal strip at those fold lines which face the metal strip, said plastic strip is provided opposite to the metal strip with nuts or with another metal strip formed with holes, and adjusting screws are screwed into said nuts or holes.

7. An instrument according to claim 1, characterized in that the deformable correcting template consists of a single thin bar, which is integrally formed with the profiled tubular carrier that accommodates the scale and the scanning unit, and said bar is adapted to be bent to constitute a shaped correcting template.

* * * * *